US007004392B2

(12) United States Patent
Mehlberg et al.

(10) Patent No.: US 7,004,392 B2
(45) Date of Patent: Feb. 28, 2006

(54) BARCODE SINGLE LASER SCANNER TARGETING

(75) Inventors: Adam Wayne Mehlberg, Longmont, CO (US); Daniel James Plutt, Superior, CO (US); Timothy Craig Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 433 days.

(21) Appl. No.: 10/034,065

(22) Filed: Dec. 19, 2001

(65) Prior Publication Data

US 2003/0111536 A1 Jun. 19, 2003

(51) Int. Cl.
*G06K 7/10* (2006.01)

(52) U.S. Cl. .......................... 235/462.01; 235/462.23; 235/385

(58) Field of Classification Search ................ 235/375, 235/383, 462.01, 462.15, 462.23, 462.08; 700/64, 215, 245
See application file for complete search history.

(56) References Cited

U.S. PATENT DOCUMENTS

| | | | | | |
|---|---|---|---|---|---|
| 5,236,258 | A | * | 8/1993 | Bunch | 360/92 |
| 5,303,034 | A | * | 4/1994 | Carmichael et al. | 356/620 |
| 5,418,732 | A | * | 5/1995 | McFadin | 700/215 |
| 5,426,581 | A | * | 6/1995 | Kishi et al. | 700/64 |
| 6,138,909 | A | * | 10/2000 | Rockwell et al. | 235/383 |
| 6,213,705 | B1 | * | 4/2001 | Wilson | 414/274 |
| 6,327,519 | B1 | * | 12/2001 | Ostwald et al. | 700/245 |
| 6,386,116 | B1 | * | 5/2002 | Ostwald | 104/287 |
| 6,438,448 | B1 | * | 8/2002 | Manes et al. | 700/218 |
| 6,643,565 | B1 | * | 11/2003 | Manes et al. | 700/259 |
| 6,664,525 | B1 | * | 12/2003 | Schmidtke et al. | 250/201.2 |
| 6,671,574 | B1 | * | 12/2003 | Hashimoto | 700/215 |
| 6,675,063 | B1 | * | 1/2004 | Bosley et al. | 700/218 |
| 6,721,625 | B1 | * | 4/2004 | Mehlberg et al. | 700/218 |

* cited by examiner

*Primary Examiner*—Ahshik Kim
(74) *Attorney, Agent, or Firm*—Yee & Associates, P.C.

(57) ABSTRACT

A robot apparatus and a barcode scanner to be used for collecting positional data parallel to the scan direction in, for example, a library storage system is provided. In one embodiment, the robotic apparatus includes a barcode scanner having a scan path and an attenuation surface within the scanner scan path. The barcode scanner scans the target while the robotic apparatus is moved in a direction parallel with the scan path. Positional data is collected in conjunction with the readability limits of the barcode target. The central position of the target in a parallel direction to the scan path is determined based on the readability of the barcode target and the correlating positional data. The barcode scanner can also scan the target while the robotic apparatus is moved in a direction perpendicular with the scan path. Positional data is collected in conjunction with the readability limits of the barcode target. The central position of the target in a perpendicular direction to the scan path is determined based on the readability of the barcode scanner and the correlating positional data.

31 Claims, 4 Drawing Sheets

MASTER CALIBRATION AREA

BARCODE SINGLE LASER SCANNER TARGETING

BACKGROUND OF THE INVENTION

1. Field of the Invention

The present invention relates generally to an apparatus for calibrating an apparatus for retrieving objects from an array of storage cells.

2. Background of the Invention

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically comprise a hand mechanism positioned on a movable arm. To retrieve information, the robotic arm is moved to position the hand near the inventory location of a desired media cartridge. The hand is then activated to grip the desired cartridge and remove it from the library inventory location. The robotic arm with the hand gripping the cartridge then moves to an appropriate position to further process the cartridge. In this manner, the robotic hand manipulates the cartridge for access to information stored on the cartridge.

However, in order to grip the cartridge, the position of the robotic arm with respect to the cartridge within the library must be determined. Positional accuracy of the robotic arm and any devices attached thereto affects both the repeatability of an operation as well as the ability of the robotic arm to accurately perform the particular task required of it. There are many different arm calibration arrangements known in the art, and many of these entail the use of some sort of sensor to determine the position of the robotic arm.

A common method of calibrating the position of the robotic arm gripper mechanism is to use a vision system to orient the robotic arm with respect to one or more baseline targets located in the work space. Often these vision systems are located underneath or above the robotic arm and are oriented at an angle relative to the robotic arm. These vision systems are located at an angle so that a target on the work space can be imaged, and then a target located on a part of the robotic arm that is extended into the field of view of the vision system is imaged. The two images are compared and the position of the robotic arm is adjusted such that the target on the robotic arm is aligned with the target on the work piece when extended.

However, orienting the vision system at an angle causes the inclusion of the vision system with the robotic arm to take up a large amount of space. Thus, a significant portion of the space within the storage library system is unusable for placing storage cells. This is due to the fact that if, for example, the vision system is located below the robotic arm, an amount of space equal to the height or thickness of the angled vision system at the bottom of the storage retrieval system cannot be accessed by the robotic arm since the vision system comes into contact with the floor of the storage library system before the robotic arm. Thus, the robotic arm is prevented from going low enough within the storage library system to engage and retrieve an object stored in a storage cell located within the thickness of the angled vision system from the floor of the storage library system.

However, as the need to store more and more data increases and the price paid for space also increases, the amount of money necessary to store data is increased. Thus, the wasted space within a library storage system becomes more and more intolerable. Therefore, there is a need for a calibration system that requires less space than current systems and that allows for a denser concentration of storage cells within a storage library system.

SUMMARY OF THE INVENTION

The present invention provides a robot apparatus and a barcode scanner to be used for collecting positional data parallel to the scan direction in, for example, a library storage system. In one embodiment, the robotic apparatus includes a barcode scanner with a scan path and an attenuation surface within the scanner scan path. The barcode scanner scans the target while the robotic apparatus is moved in a direction parallel with the scan path. Positional data is collected in conjunction with the readability limits of the barcode target. The central position of the target in a parallel direction to the scan path is determined based on the readability of the barcode target and the correlating positional data. The barcode scanner can also scan the target while the robotic apparatus is moved in a direction perpendicular with the scan path. Positional data is collected in conjunction with the readability limits of the barcode target. The central position of the target in a perpendicular direction to the scan path is determined based on the readability of the barcode scanner and the correlating positional data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
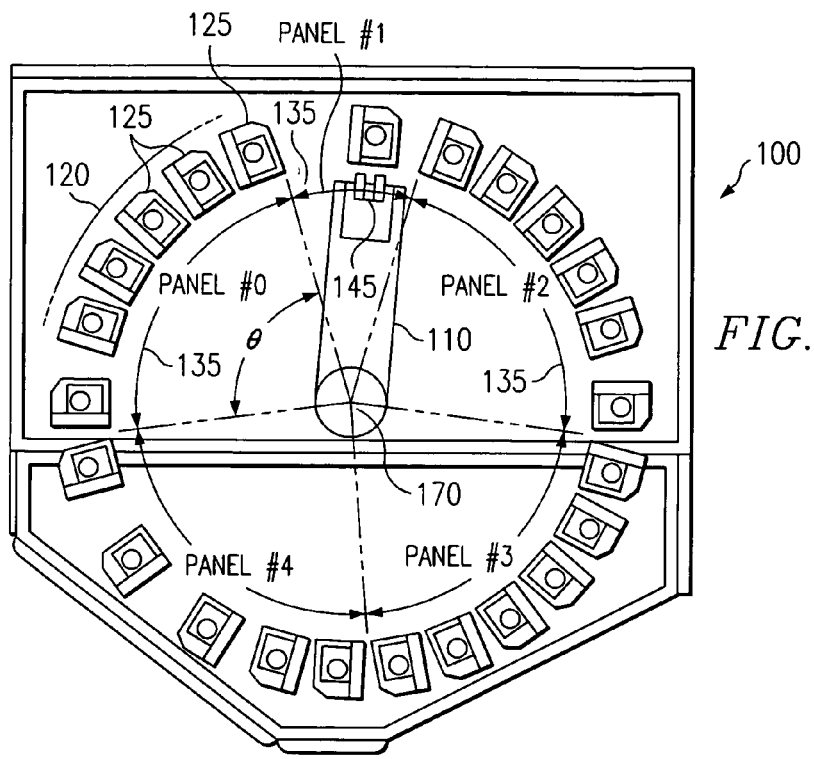
FIG. 1 depicts a top view of the overall architecture of a typical automated robotic tape library system wherein the calibration system of the present invention is employed.

With reference now to the Figures and, in particular, with reference to FIG. 1, a top view of the overall architecture of a typical automated robotic tape library system 100 wherein the calibration system of the present invention is employed is depicted. A typical automated library system operates to store and retrieve a large number of magnetic tape cartridges for an associated host processor. Library system 100 includes an array 120 of circularly arranged cells 130 for storing magnetic tape cartridges. A robotic arm 110 is pivotally rotatable about the center of array 120 and contains a tape cartridge retrieval mechanism 145.

Figure 2:
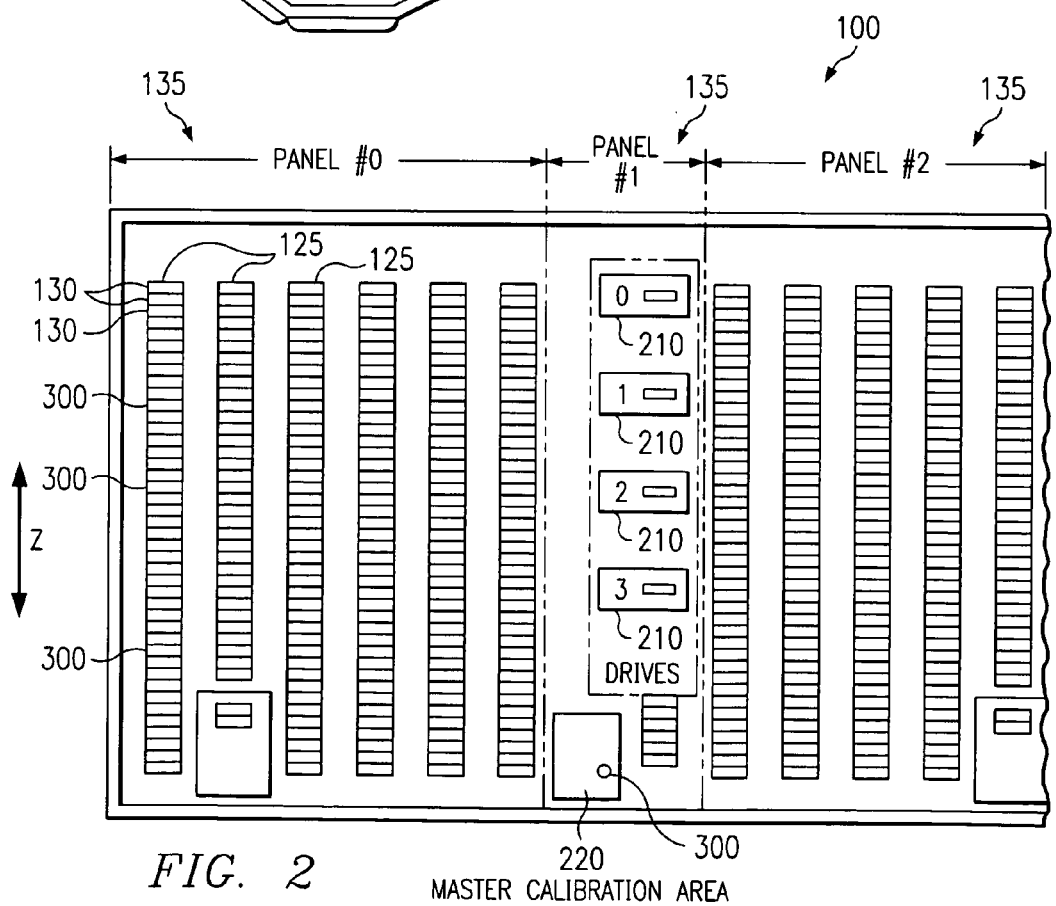
FIG. 2 depicts a side view of a segment of library system in accordance with the present invention.

Referring now to FIG. 2, a side view of a segment of library system 100 is depicted in accordance with the present invention. Tape cartridge retrieval mechanism 145 is located in a position for retrieving and replacing tape cartridges in the tape cartridge storage cells 130. The retrieved tape cartridges are loaded into a tape transport mechanism (tape drives) 210 in response to a read/write request from a host computer (not shown) which is connected to library system 100. Tape cartridge storage cells 130 and tape drives 210 are arranged in columns 125 which are grouped in "panels" 135.

Library system 100 is provided as an example of a library system in which the present invention may be implemented. However, the present invention is not limited to use in silo type library systems, but may be used in any other type of library system, such as, for example, linear library systems and U-shaped library systems.

Figure 3:
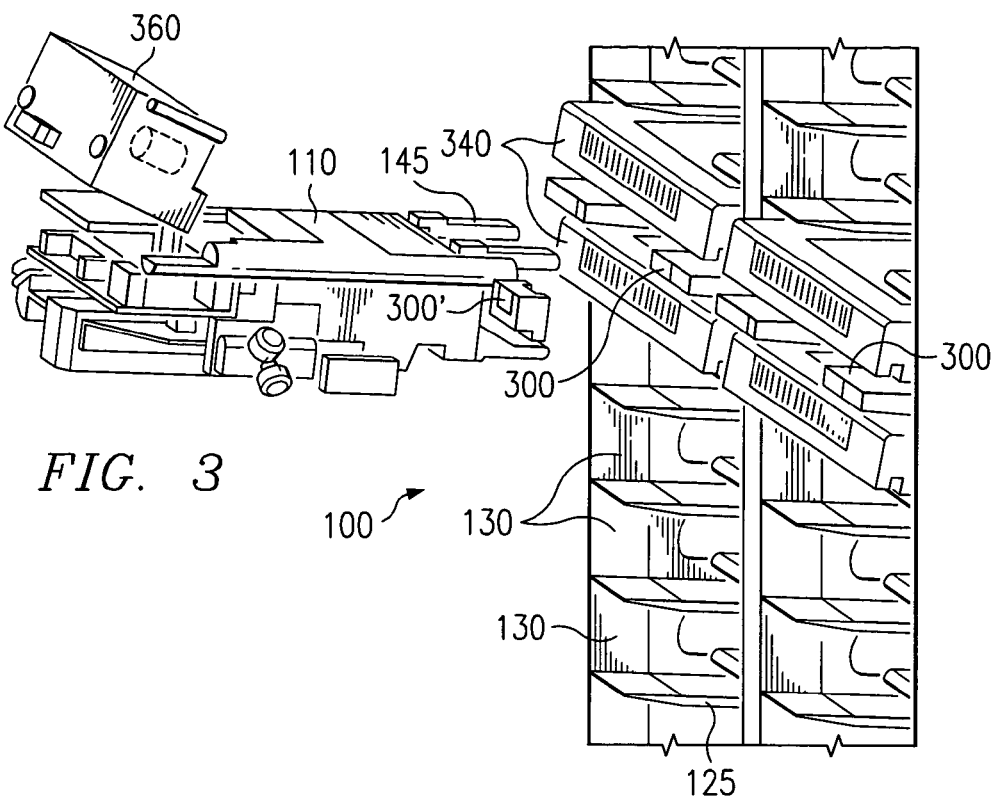
FIG. 3 shows a perspective cutaway view of a tape library system showing several of the plurality of locations of target.
Figure 4:
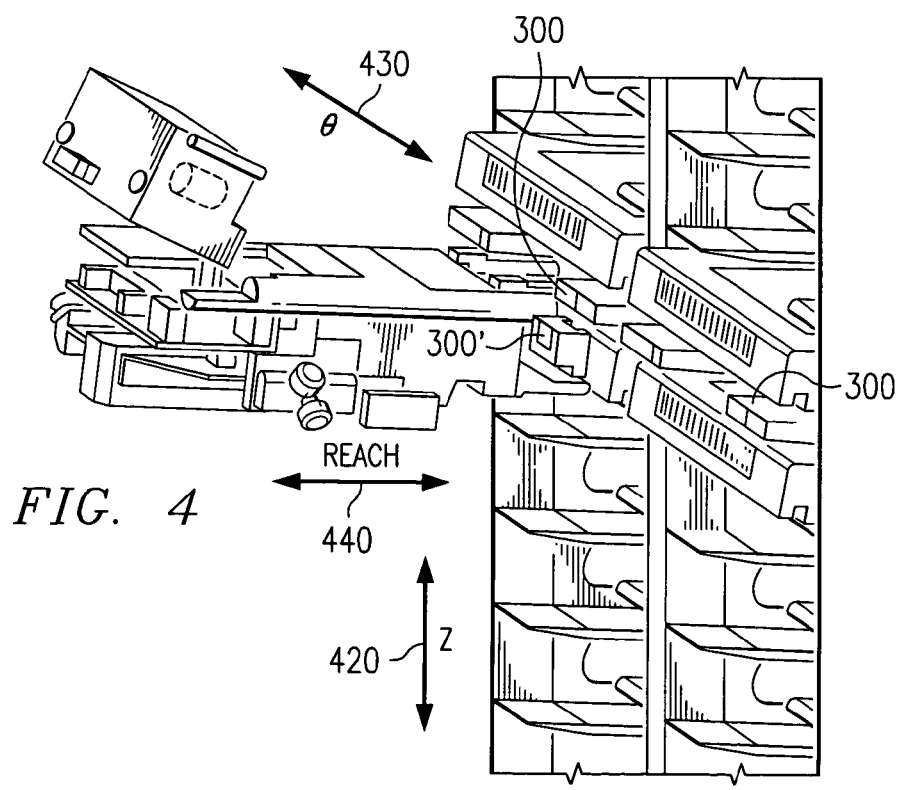
FIG. 4 illustrates the environment shown in FIG. 3 wherein the robotic arm retrieval mechanisms shown in FIG. 3 is grasping a tape cartridge with the robotic arm target positioned in close proximity to a cartridge cell.

Referring now to FIGS. 3 and 4, perspective cutaway views of a prior art robotic arm and storage cells suitable for use with tape library system 100 are depicted. FIG. 3 shows a perspective cutaway view of a tape library system showing several of the plurality of locations of target 300.

In the prior art, one or more "N"-shaped calibration targets 300 are located on each column 125 of tape cartridge storage cells 130. The position of the robotic arm 110 with respect to the tape cartridge storage cells 130 is determined and adjusted by using a line scan camera vision system 360 to scan these calibration targets 300 located in each of the columns 125. An "N"-shaped target 300' located on the cartridge retrieval mechanism 145 is also used to calibrate the position of the camera 360 with respect to the cartridge retrieval mechanisms 145.

FIG. 4 illustrates the environment shown in FIG. 3 wherein the robotic arm retrieval mechanisms shown in FIG. 3 is grasping a tape cartridge 340 with the robotic arm target 300 positioned in close proximity to a cartridge cell.

Figure 5:
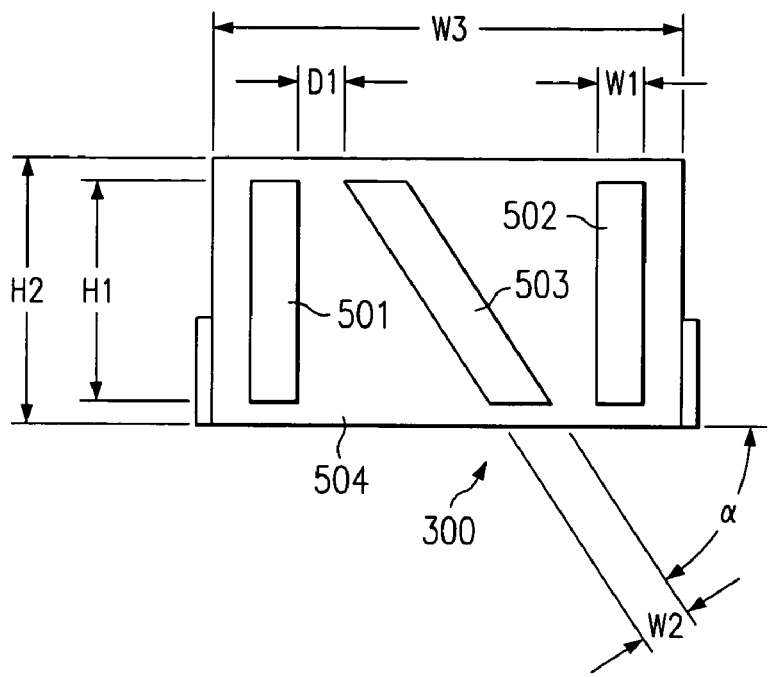
FIG. 5 depicts a diagram illustrating a calibration target in accordance with the prior art.

Referring now to FIG. 5, a diagram illustrating a calibration target, which can be implemented as calibration target 300 in FIG. 3, is depicted in accordance with the prior art. Position calibration target 300 comprises two elements, a background 504 and a plurality of positioning indicia 501–503 imprinted thereon. The positioning indicia 501–503 and the background 304 are selected to be easily distinguishable from each other to enable the line scan camera system to precisely delimit the plurality of positioning indicia 501–503 from the background 504. This is accomplished by the use of contrasting colors whose reflectivity is significantly different. An example of this would be the use of white positioning indicia 501–503 printed on a black background 504. The use of this difference in reflectivity simplifies the task of the line scan camera to delimit the position and boundaries of the plurality of positioning indicia 501–503. Alternatively, other methods that provide high contrast, such as, for example, light producing elements, may be used to produce the target.

As illustrated in FIG. 5, the plurality of positioning indicia 501–503 comprise a pair of parallel oriented, spaced apart, substantially rectangular bars 501 and 502, each of which has a first end and a second end with, for example, the first end being located at the top of FIG. 5 and the bottom end being located at the bottom of FIG. 5 for the purpose of this description. The third positioning indicia comprises diagonal bar 503 which is substantially parallelogram shaped and extends diagonally from the first end of indicia 501 to the second end of indicia 502 such that indicia 503 comprises a diagonal bar that can be used as described below to assist in the position determination process. Each of the parallel indicia 501, 502 is of substantially the same dimensions having a width W1 and a height H1 while the parallelogram shaped bar 503 has a width W2 and a height H1. The selection of exact values for these dimensions is a matter of design choice and is somewhat dictated by the selection of the line scan camera 460 used for the positioning determination. The overall target 500 has a width W3 and a height H2 such that the parallel oriented indicia 501, 502 extend substantially along the full height of target 500 while the diagonal indicia 503 traverses a significant portion of the width W3 of target 500. The parallelogram shaped indicia 503 as illustrated in FIG. 5 does not come in contact with either indicia 501 or 502 but is spaced apart there from by a distance D1 in order to provide three distinct indicia for positioning purposes. Optionally, indicia 503 can be joined at either end with indicia 501 and 502 to form a substantially N-shaped pattern on target 300. The parallelogram shaped indicia 503 is angled at an angle α from the horizontal as shown in FIG. 5.

However, in the prior art, camera vision system 360 is a line scan camera and thus, takes up a considerable amount of space either above the robotic arm 110 and cartridge retrieval mechanism 145 (also referred to as a robotic hand or gripper) or below the robotic arm 110 and cartridge retrieval mechanism 145. This extra space needed for the camera vision system 360 reduces the number of storage cells 130 that can be placed in a given area since vertical space needed to accommodate the camera vision system 360 cannot be used to provide storage cells 130. Therefore, in order to increase the density of storage cells 130 in a particular library, the camera vision system 360 of the present invention is implemented as a barcode laser scanner rather than a line scan camera as was typical in the prior art. Barcode scanners are commonly available products used in systems, such as, for example, check out scanners for super markets and are well known in the art. A barcode scanner is smaller than a line scan camera. Therefore, less space is needed to accommodate the barcode scanner. Thus, more room is available for storage cells, thereby increasing the storage density of a storage library.

Figure 6:
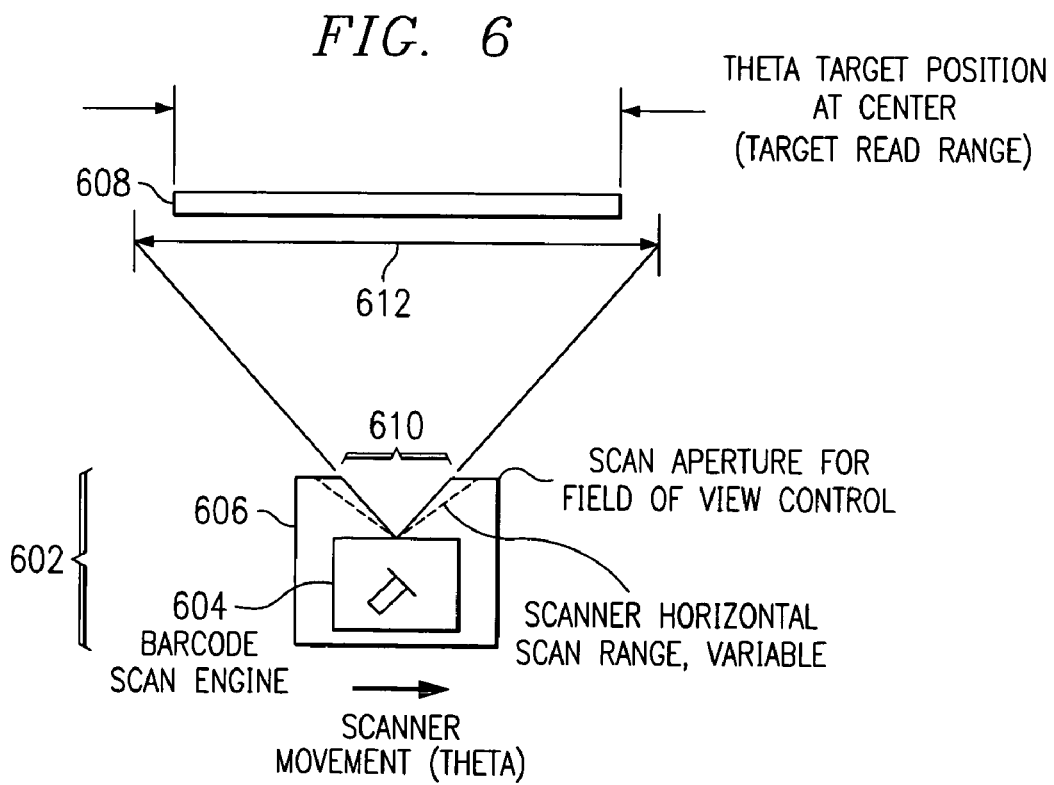
FIG. 6 depicts a top view diagram of a barcode scan apparatus suitable for use with a cartridge retrieval system in accordance with the present invention.

With reference now to FIG. 6, a diagram of a barcode scanning apparatus suitable for use with a cartridge retrieval system is depicted in accordance with the present invention. Barcode scan apparatus 602 may be implemented as the camera vision system 360 in FIG. 3. Barcode scan apparatus 602 includes a barcode laser or charge coupled device (CCD) scan engine 604, and an aperture 606. Barcode scan apparatus 602 is smaller than the line scan camera used in the prior art. Therefore, a smaller amount of space is necessary to accommodate the camera vision system 360. Thus, more space in the library storage system may be devoted to storage cells, thereby increasing the storage density of the library storage system.

Barcode scan cameras or engines have not been used for calibration purposes in the prior art because the output from barcode scanners is merely the decoded value of the bar code scanned by the barcode scanner. Therefore, barcode scanners do not provide any pixel data. Furthermore, the scan width of the laser scanner beam from the barcode laser scanner is not controlled. Therefore, the proper calibration measurements cannot be made. However, to overcome these shortcomings, the present invention incorporates an aperture 606 between the barcode scan engine 604 and a target barcode 608. The aperture opening 610 must be smaller than the scan width of the barcode scan engine 604, thus ensuring that the scan width 612 is uniform. The flexture is a mechanical apparatus within the barcode scan engine that controls the movement of the mirror that reflects the laser light across an area. Since the flexture is mechanical, the movement of the robotic arm 110 during the calibration procedure will affect the flexture causing the scan width 612 to be variable. The aperture 608 is situated to reduce the scan width generated by the movement of the flexture such that the scan width is uniform. This produces a non-variable scan-width giving a controlled end of scan.

To determine the center of the target in the direction parallel to the scan path, the robotic arm 110 is moved in the direction of scan path until the target 608 first becomes readable. This position is recorded through the use of a positional encoding device. The robotic arm 110 continues to move in the same direction until the target is no longer readable by the barcode scanner apparatus 602. This position is also recorded. The center of the target in the scan path direction is then the half distance position between these two positions.

Figure 7:
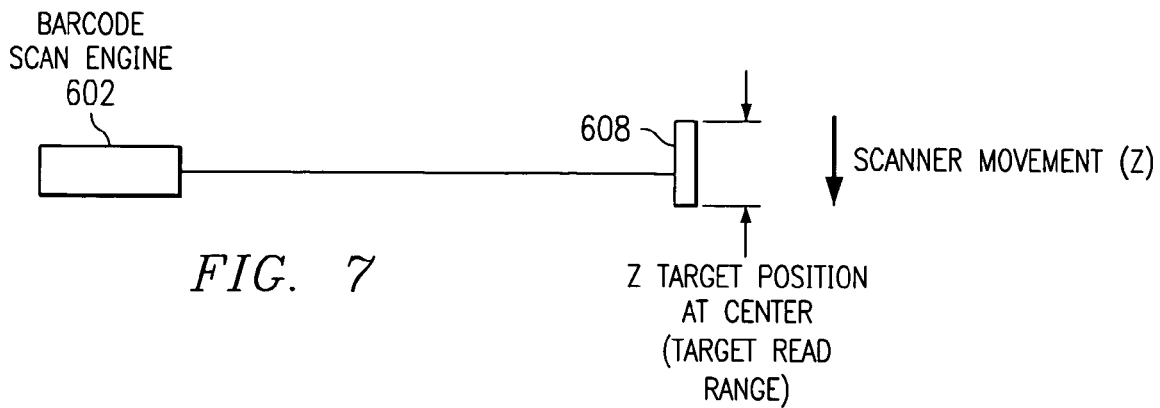
FIG. 7 depicts a side view diagram illustrating a method of determining the Z target position center in accordance with the present invention.
Figure 8:
FIG. 8 depicts a barcode target that may be used in conjunction with the barcode laser scanner of the present invention.

With reference now to FIG. 7, a diagram illustrating a method of determining the target position center when the scanner is moving perpendicular to the barcode scan path is depicted in accordance with the present invention. Barcode scan apparatus 602 is moved in a direction perpendicular to the barcode scan path 612 by robotic arm 110 until the target 608 is first readable by the barcode scan apparatus 602. The position is recorded through the use of a positional encoding device. The barcode scan apparatus 602 continues to move in a direction perpendicular to the scan path 612 until the target 608 is no longer readable by the barcode scan apparatus 602. This position is also recorded. The half distance is calculated which provides the center position of the target in the direction perpendicular to the barcode scan path 612. The target 608 may be a barcode similar to that depicted in FIG. 8.

Figure 9:
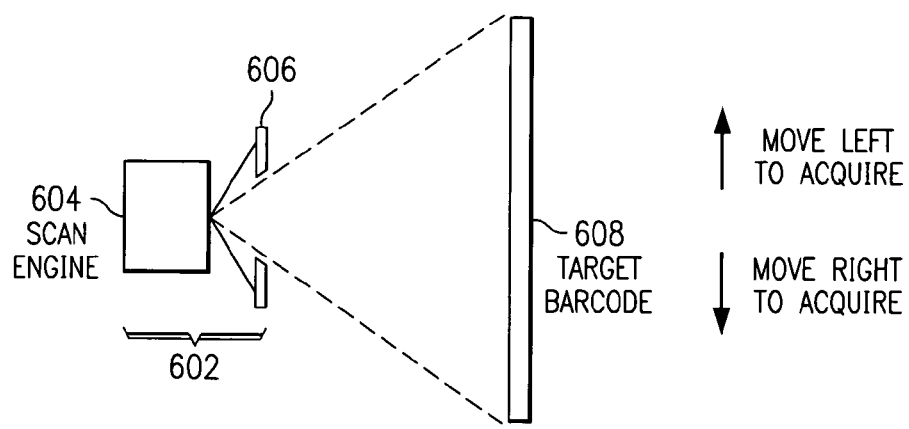
FIG. 9 depicts a top view diagram depicting more detail about the aperture associated with the barcode scan apparatus in accordance with the present invention.

With reference now to FIG. 9, a diagram depicting more detail about the aperture associated with the barcode scan apparatus is depicted in accordance with the present invention. As depicted, the aperture 606 opening is beveled to ensure that specular reflections are not sent back into the scanner 604. Furthermore, the aperture should be black anodized (i.e., black matt with powder coating that spreads or scatters light) to further ensure that specular scattering does not result in light being reflected back into the scanner 604 from the aperture. In some embodiments, the aperture is constructed from metal. However, other materials may be utilized. The sharper the bevel, the less likelihood of specular reflections being sent back into the scanner 604.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A robot, the robot comprising:
   a barcode scanner with a scan path, wherein the barcode scanner is affixed to the robot;
   an attenuation surface affixed to the barcode scanner, wherein the attenuation surface is located such that at least one end of the scan path of the barcode scanner is controlled by the attenuation surface to form a controlled end of scan, and wherein the controlled end of scan is used to determined a location of the attenuation surface with respect to a target associated with at least one storage cell within a storage library.

2. The robot as recited in claim 1, wherein the attenuation surface comprises a plurality of edges and wherein at least one of the edges are beveled.

3. The robot as recited in claim 1, wherein the attenuation surface is constructed from a material that is formable into sharp edges.

4. The robot as recited in claim 1, wherein the attenuation surface reflects light from a scanner illumination source in a non-detrimental manner.

5. The robot as recited in claim 1, wherein the attenuation surface controls one or more ends of the scan path during movement of the robot parallel to the scan path in order to determine a target position in a first coordinate frame.

6. The robot as recited in claim 1, wherein the movement of the barcode scanner substantially orthogonal to the scan path will determine the target position relative to positional data from the robot in a second coordinate frame.

7. The robot as recited in claim 1, wherein the target is a barcode.

8. The robot as recited in claim 1, wherein the attenuation surface comprises a metal.

9. The robot as recited in claim 1, wherein the attenuation surface is black anodized.

10. The robot as recited in claim 1, wherein the barcode scanner is a laser scanner.

11. The robot as recited in claim 10, wherein the laser scanner comprises:
    a laser; and
    a moveable reflecting surface which reflects light from the laser to an object external to the laser scanner.

12. A positional determination device, the device comprising:
    a barcode scanner with a scan path affixed to a moveable object;
    an attenuation surface affixed to the barcode scanner, wherein the attenuation surface is located such that at least one end of the scan path is controlled by the attenuation surface to form a controlled end of scan, wherein the controlled end of scan is used to determined a location of the object with respect to an external object.

13. A library storage system, the system comprising:
    a plurality of storage cells, wherein at least some of the plurality of storage cells include a target;
    a robot for moving items to and from the storage cells, wherein the robot includes a barcode scanner with a scan path, an attenuation surface, wherein the attenuation surface is located such that at least one end of the scan path is controlled by the attenuation surface to form a controlled end of scan, wherein the controlled end of scan is used to determine a location of the attenuation surface with respect to the target.

14. The library storage system as recited in claim 13, wherein at least one of the edges of the attenuation surface is beveled.

15. The library storage system as recited in claim 13, wherein the attenuation surface is constructed from a material that is formable into sharp edges.

16. The library storage system as recited in claim 13, wherein the attenuation surface is configured to reflect a scanner illumination source in a non-detrimental manner.

17. The library storage system as recited in claim 13, wherein the attenuation surface controls at least one end of the scan path during movement of he robot parallel to the scan path to determine target position in a first coordinate frame.

18. The library storage system as recited in claim 13, wherein the movement of the barcode scanner substantially orthogonal to the scan path determines the target position relative to positional data from the robot in a second coordinate frame.

19. The library storage system as recited in claim 13, wherein the target is a barcode.

20. A method for determining the position of a robot relative to a target, the method comprising:
moving a robot, having a barcode scan engine with a scan path having a scan path width controlled by an attenuation surface in a direction substantially parallel to the scan path;
determining a first parallel position at which the target is first readable by the barcode scan engine; and
determining a second parallel position at which the target first becomes unreadable by the barcode scan engine.

21. The method as recited in claim 20, further comprising:
determining the center of the target in the parallel direction from the first and second parallel positions.

22. The method as recited in claim 21, wherein the step of determining the center of the target in the parallel direction comprises assigning a position halfway between the first and second parallel positions as the center position of the target in the parallel direction.

23. The method as recited in claim 20, further comprising:
moving the robot in a direction substantially perpendicular to the scan path;
determining a first perpendicular position at which the target first becomes readable to the barcode scanner; and
determining a second perpendicular position at which the target first becomes unreadable by the barcode scanner.

24. The method as recited in claim 23, further comprising:
determining the center of the target in the perpendicular direction from the first and second perpendicular positions.

25. The method as recited in claim 24, wherein the step of determining the center of the target in the perpendicular direction comprises assigning the midpoint between the first and second perpendicular positions as the center of the target in the perpendicular direction.

26. A system for determining the position of a robot relative to a target, the system comprising:
first means for moving a robot, having a barcode scan engine with a scan path having a scan path width controlled by an attenuation surface, in a direction substantially parallel to the scan path;
second means for determining a first parallel position at which the target is first readable by the barcode scan engine; and
third means for determining a second parallel position at which the target first becomes unreadable by the barcode scan engine.

27. The system as recited in claim 26, further comprising:
fourth means for determining the center of the target in the parallel direction from the first and second parallel positions.

28. The system as recited in claim 27, wherein the fourth means comprises assigning a position halfway between the first and second parallel positions as the center position of the target in the parallel direction.

29. The system as recited in claim 26, further comprising:
fourth means for translating the robot in a direction substantially perpendicular the scan path;
fifth means for determining a first perpendicular position at which the target first becomes readable to the barcode scanner; and
sixth means for determining a second perpendicular position at which the target first becomes unreadable by the barcode scanner.

30. The system as recited in claim 29, further comprising:
seventh means for determining the center of the target in the perpendicular direction from the first and second perpendicular positions.

31. The system as recited in claim 30, wherein the seventh means comprises assigning the midpoint between the first and second perpendicular positions as the center of the target in the perpendicular direction.

* * * * *